United States Patent [19]

Hill et al.

[11] 3,903,249

[45] Sept. 2, 1975

[54] CARBON BLACK FEEDSTOCK

[75] Inventors: George R. Hill; Homer M. Fox, both of Bartlesville, Okla.

[73] Assignee: Phillips Petroleum Company, Bartlesville, Okla.

[22] Filed: Jan. 17, 1973

[21] Appl. No.: 324,393

Related U.S. Application Data

[63] Continuation-in-part of Ser. No. 841,567, July 14, 1969, abandoned.

[52] U.S. Cl. ............... 423/449; 423/445; 423/450; 423/456
[51] Int. Cl. ......................... C09c 1/48; C09c 1/50
[58] Field of Search ........... 423/449, 450, 455, 456, 423/457, 445; 23/259.5

[56] References Cited
UNITED STATES PATENTS

| | | | |
|---|---|---|---|
| 1,606,380 | 11/1926 | Pagenkoff | 423/449 |
| 3,073,681 | 1/1963 | Ceresna | 423/450 |
| 3,175,888 | 3/1965 | Krejei | 423/450 X |
| 3,563,706 | 2/1971 | Gunnell | 423/456 |
| 3,674,433 | 7/1972 | Wyatt | 423/450 |
| 3,700,615 | 10/1972 | Scott | 423/449 X |
| 3,808,328 | 4/1974 | Kelly | 423/449 |

FOREIGN PATENTS OR APPLICATIONS

| | | | |
|---|---|---|---|
| 318,605 | 10/1969 | U.S.S.R. | 423/450 |

*Primary Examiner*—Edward J. Meros

[57] ABSTRACT

A method of producing carbon black under conventional operating conditions and in conventional furnace carbon black equipment in which the feedstock comprises a carbon-containing material in polymeric form in a liquid, solid, or solution state.

11 Claims, No Drawings

CARBON BLACK FEEDSTOCK

This is a continuation-in-part of our application Ser. No. 841,567 filed July 14, 1969 now abandoned.

This invention relates to the production of carbon black.

In one of its more specific aspects, this invention relates to the production of carbon black from normally solid polymeric materials.

The production of furnace carbon black from naturally-occurring hydrocarbons is well know. Generally, the process comprises the pyrolytic decomposition of a hydrocarbon in the presence of an oxidant to produce particulate carbon black contained in gaseous byproducts. Subsequent operations are directed to recovery of the carbon black from the gases.

The production and use of nonbiodegradable plastics is also well known. Such plastics include synthetic polymers such as polypropylene, polyvinylchloride, polystyrene, and polyethylene. These materials have found wide use in the production of containers and articles such as household ware, clothing, furniture and the like. Unfortunately, such items do not degrade rapidly and their disposition after use causes considerable problems in waste disposal.

The method of this invention is directed towards the solution of this problem by employing such polymers as at least a portion of the feed to the furnace carbon black production process. In this manner, the difficultly-disposable plastics are converted to carbon blacks which can be used, as such, or which can be blended with larger quantities of other carbon blacks within acceptable limits.

Accordingly, in the present invention plastics of the aforementioned kinds are disposed of and carbon black is produced by employing as a feedstock to the furnace carbon black process at least one polymer selected from the group consisting of polypropylene, polyvinylchloride, polystyrene and polyethylene. These materials are polymers and copolymers of monoolefins and monohalogen substituted monoolefins.

In one embodiment of this invention, the process will employ at least one such material in solution with a prior art carbon black furnace feedstock. For example, the polymer material will be dissolved in a prior art feedstock such as an aromatic $SO_2$ extract oil (e.g., average molecular weight about 300, Bureau of Mines Correlation Index of about 100).

In another of its embodiments, this invention will pertain to a process employing at least one polymer material in such form as to be individually introducible into the carbon black furnace. For example, the polymeric material can be introduced into the furnace in the form of small particles contained in the gaseous oxidant, usually air, introduced into the reactor to oxidize the fuel to produce hot combustion gases.

Accordingly, it is an object of this invention to provide a new source of charge stock for the production of carbon black.

It is also an object of this invention to provide a method of disposing of waste polymeric materials.

The method of this invention contemplates as a feestock at least one polymer or copolymer of a monoolefin or monohalogen-substituted monoolefins. Such materials include that group of materials conventionally classifed as solid synthetic polymers including polypropylene, polyvinylchloride, polystyrene and polyethylene. Such polymers include amorphous polymers such as amorphous polypropylene.

The method of this invention can be carried out in that equipment and under those operating conditions conventionally employed to produce carbon black. In general, the polymer will be introduced as a solid or in solution into a carbon black furnace of such types as are described in U.S. Pat. Nos. 2,564,700, 2,616,794 and 3,355,247.

Introduced into the reactor will be the hydrocarbon feed, including the polymer, a fuel, usually natural gas, and an oxidant, usually air. The fuel will be oxidized by the air to produce hot combustion gases. The hydrocarbon feed and the polymer will be conducted through the reactor in contact with the hot combustion gases under conditions to bring the feed and the polymer to their pyrolytic decomposition temperature, under which conditions the feed and the polymer decompose to form carbon black. These conditions involve any suitable pressure within the reactor and decomposition temperatures within the range of about 1600° to about 3200°F. Generally, the air to total hydrocarbon feed and polymer ratio will be within the range of from about 200 to about 1400 SCF per 10 pounds combined weight of feed and polymer, this quantity of air being in excess of that stoichiometric amount or up to about 2.5 times the stoichiometric quantity required for combustion of the fuel employed.

It has been determined from actual operating data, such as that presented below, that the nature of the carbon black produced from the polymers is related to the aromaticity of the polymeric materials in much the same manner as the aromaticity of conventional hydrocarbon feeds are determinative of the quality of the carbon black produced. For example, it has been found that since the components from which a polyethylene polymer is formed have a lower aromaticity than the components from which polystyrene polymer is formed, the carbon black produced from polyethylene exhibits properties more comparable to that black produced from a low Bureau of Mine Correlation Index material than does that black produced from the polystyrene. For this reason, if the invention is practiced having as its principal object the production of a marketable grade carbon black, polymers produced from aromatic hydrocarbons will be employed to produce high structure blacks and polymers produced from nonaromatic hydrocarbons will be employed to produce low structure blacks. In producing marketable carbon blacks, then, the extent to which the properties of that carbon black produced from the hydrocarbon feed will be affected by the employment of the polymer as feed can easily be predicted by one skilled in the art.

On the other hand, when the method of this invention is carried out with its principal purpose being the disposal of solid polymers rather than the production of a marketable grade carbon black, the nature of the polymer which is employed is of no consequence.

Accordingly, the polymers can be employed individually or as mixtures. They can be used in conjunction with all other feedstocks which are conventionally employed in carbon black production.

The polymer can be introduced into the reactor as a solid, dissolved in a hydrocarbon solvent, or as the solid portion of a slurry. If introduced as a solid, the polymer is preferably introduced in particulate form, preferably from about 200 to about 400 mesh. As such it can be introduced as a suspension in any hydrocarbon which decomposes to form carbon black or which is combustible as a fuel. Similarly, it can be introduced as the solute in a hydrocarbon solvent which decomposes to form carbon black or which is combustible as a fuel.

If the polymer is introduced as a slurry, the slurry can contain polymer in an amount within the range of from 50 to 75 volumes of the solid per 100 volumes of the liquid, particularly if the slurry is preheated to a temperature of about 650°F.

If the polymer is introduced as the solute of a hydrocarbon solution, it can be contained in the solution at any concentration up to the point at which the solution becomes saturated with the polymer.

If the polymer is introduced as a particulate solid, it will be introduced at any convenient rate at which it can be carried into the furnace as a dispersion in a gaseous carrier, the extent thereof being dependent upon the velocity at which the gaseous carrier is introduced into the furnace.

Regardless of how the polymer is introduced into the furnace, it can be introduced in an amount within the range of from about 0.5 to about 20 weight percent of the total weight of the hydrocarbon feedstock and the polymer, that is, of those materials which decompose in the furnace to form carbon black. For example, if into the furnace there is introduced benzene as the hydrocarbon feed, a polymer, and natural gas, the polymer, regardless of how introduced, will be introduced in an amount within the range of from about 0.5 to about 20 weight percent of the benzene and the polymer.

The preferred method of employing polymers as those materials introduced into a carbon black furnace to form carbon black is to dissolve the polymer in a solvent to form a solution saturated with a polymer. This solution is then mixed with the hydrocarbon oil and the mixture is introduced into the furnace. A preferred solvent is benzene.

The foregoing conclusions are based upon a series of actual runs, the results of which are presented below.

In runs 2 and 3, a solid polystyrene plastic was dissolved in benzene to the extent of the concentration shown. This benzene was then introduced into a precombustion-type carbon black reactor such as that depicted in U.S. Pat. No. 2,564,700. In so doing, the benzene served as both the solvent for the polymer and the hydrocarbon feedstock. Natural gas (about 1000 Btu/SCF) was employed as fuel and air was employed as the oxidant. The benzene-polymer solution feed rate was as shown with sufficient fuel and air being introduced to maintain a carbon black formation temperature of about 2600°F.

For comparative purposes, run 1 was carried out under substantially identical purposes except that the benzene feed contained no polymer. Results were as follows:

TABLE I

| Run No. | Feed Composition, Wt. % Benzene | Polystyrene | Feed Rate /Hr. | Carbon Black Yield, /Gal. | Carbon Black Surface Area, $N_2SA$, $m^2/g$ |
|---|---|---|---|---|---|
| 1 | 100 | 0 | 66.2 | 3.49 | 82.3 |
| 2 | 99 | 1 | 67.4 | 3.52 | 67.1 |
| 3 | 95 | 5 | 63.3 | 3.50 | 75.8 |

The above data indicate results actually obtained employing polystyrene as a portion of the feed to a furnace carbon black process.

In Table II are shown two runs actually made in a second reactor under conditions comparable among themselves and comparable to those conditions employed for runs 1, 2 and 3, except as concerns rates.

In run 4, benzene, alone, was employed as the feed. In run 5, a solution containing 2.2 weight percent polyvinylchloride was employed as the feedstock, no other hydrocarbon being introduced as feedstock in either of the two runs. Results were as follows:

TABLE II

| Run No. | Feed Composition, Wt. % Benzene | Polyvinylchloride | Feed Rate /Hr. | Carbon Black Yield, /Gal. | Surface Area, $I_2$ No., mg/g |
|---|---|---|---|---|---|
| 4 | 100 | 0 | 13.4 | 3.78 | 90 |
| 5 | 97.8 | 2.2 | 13.7 | 3.83 | 92 |

The above data indicate results actually obtained employing polyvinylchloride as a portion of the feed to a furnace carbon black process.

It will be evident from the foregoing that various modifications can be made to the method of this invention. Such, however, are considered as being within the scope of the invention.

What is claimed is:

1. A method of producing carbon black by the pyrolytic decomposition of a hydrocarbon feedstock which comprises:

a. introducing a liquid hydrocarbon feedstock and a polymeric substance selected from the group consisting of polypropylene, polyvinylchloride, polystyrene and polyethylene into a furnace; said polymeric substance comprising an amount within the range of from 0.5 to about 20 weight percent of the total weight of said feedstock and said polymeric substance;

b. introducing a fuel and a gaseous oxidant into said furnace;

c. oxidizing said fuel with said gaseous oxidant in contact with said hydrocarbon feedstock and said polymeric substance under carbon black forming conditions to bring said feedstock and said polymeric substance to their carbon black forming temperatures and to form carbon black; and, d. recovering the carbon black.

2. The method of claim 1 in which said polymeric substance is dissolved in said hydrocarbon feedstock.

3. The method of claim 1 in which said polymeric substance is suspended in particulate form in said hydrocarbon feedstock.

4. The method of claim 1 in which said polymeric substance is suspended in particulate form in said fuel or in said gaseous oxidant.

5. The method of claim 1 in which said polymeric substance is dissolved in benzene.

6. The method of claim 1 in which said hydrocarbon feedstock comprises benzene, said polymeric substance comprises polystyrene and said polystyrene is introduced as a solute in said benzene.

7. The method of claim 6 in which said polystyrene is contained in said benzene in an amount within the range of from 1 to 5 weight percent.

8. The method of claim 1 in which said hydrocarbon feedstock comprises benzene, said polymeric substance comprises polyvinylchloride and said polyvinylchloride is introduced as a solute in said benzene.

9. The method of claim 8 in which said polystyrene is contained in said benzene in an amount of about 2.2 weight percent.

10. The method of claim 5 in which said polymeric substance and said benzene are mixed with said hydrocarbon feedstock to form a mixture and said mixture is introduced into said furnace.

11. The method of claim 1 in which the hydrocarbon feedstock is an aromatic $SO_2$ extract oil.

* * * * *